(12) United States Patent
Lim et al.

(10) Patent No.: US 12,540,042 B2
(45) Date of Patent: Feb. 3, 2026

(54) TRANSFER APPARATUS

(71) Applicant: SEMES CO., LTD., Cheonan-si (KR)

(72) Inventors: Do-Youn Lim, Hwaseong-si (KR); Kuk Saeng Kim, Yongin-si (KR); Wan Hee Jeong, Hwaseong-si (KR)

(73) Assignee: SEMES CO., LTD., Cheonan-si (KR)

( * ) Notice: Subject to any disclaimer, the term of this patent is extended or adjusted under 35 U.S.C. 154(b) by 530 days.

(21) Appl. No.: 17/990,721

(22) Filed: Nov. 20, 2022

(65) Prior Publication Data
US 2023/0159282 A1    May 25, 2023

(30) Foreign Application Priority Data

Nov. 22, 2021    (KR) ........................ 10-2021-0161397

(51) Int. Cl.
*B65G 47/00*     (2006.01)
*B65G 47/90*     (2006.01)

(52) U.S. Cl.
CPC .................................... *B65G 47/90* (2013.01)

(58) Field of Classification Search
CPC ...... B62D 21/152; E01F 15/148; B65G 47/90
See application file for complete search history.

(56) References Cited

U.S. PATENT DOCUMENTS

| | | | |
|---|---|---|---|
| 6,282,769 B1 * | 9/2001 | Longo | B62D 21/152 29/445 |
| 2014/0159423 A1 * | 6/2014 | Chang | B62D 21/152 296/187.09 |
| 2023/0228048 A1 * | 7/2023 | De Vos | E01F 15/148 188/375 |

FOREIGN PATENT DOCUMENTS

| | | |
|---|---|---|
| KR | 20-1998-0025659 | 8/1998 |
| KR | 20-1998-0046347 | 9/1998 |
| KR | 10-2003-0045512 | 6/2003 |
| KR | 10-1889288 | 6/2018 |
| KR | 10-2247042 | 1/2021 |

OTHER PUBLICATIONS

Office Action from the Korean Intellectual Property Office dated Mar. 27, 2023.

* cited by examiner

*Primary Examiner* — Steven O Douglas

(57) ABSTRACT

The inventive concept provides a transfer apparatus. The transfer apparatus includes a transfer truck; and a bumper device installed at any one of the front part or the rear part of the transfer truck, and wherein the bumper device includes: a bumper provided spaced apart from the transfer truck; and an impact attenuation unit provided between the bumper and the transfer truck and configured to attenuate an impact force transferred from the bumper to the transfer truck by a friction force.

18 Claims, 10 Drawing Sheets

TRANSFER APPARATUS

CROSS-REFERENCE TO RELATED APPLICATIONS

A claim for priority under 35 U.S.C. § 119 is made to Korean Patent Application No. 10-2021-0161397 filed on Nov. 22, 2021, in the Korean Intellectual Property Office, the entire contents of which are hereby incorporated by reference.

BACKGROUND

Embodiments of the inventive concept described herein relate to a transfer apparatus.

In general, in a manufacturing process of a semiconductor element or a display element, materials such as a semiconductor wafer, a semiconductor strip, a glass substrate, a display panel, etc. may be transferred by an unmanned transport system such as an overhead hoist transport (OHT) apparatus, a rail guided vehicle (RGV) apparatus, etc. In particular, the transfer apparatuses may include a transfer vehicle configured to move along a driving rail installed on the ceiling or the floor of a clean room, and an operation control of the transfer vehicle may be controlled by an upper control device such as an OCS (OHT Control Server) apparatus.

For example, in the clean room for manufacturing semiconductor devices, driving rails for material transfer may be installed on the ceiling, and a plurality of transport vehicles may be movably arranged along the driving rails. The operation control of the transfer vehicles may be carried out by the OCS device, and the transfer vehicles and the OCS device may be connected to each other in a wireless communication method.

Meanwhile, if an abnormality occurs while the transfer vehicle is moving on the driving rail, the transfer vehicle may stop on the driving rail. In this case, if another subsequent transfer vehicle does not detect the stopped transfer vehicle, a collision between the transfer vehicles may occur, which may damage the transfer vehicles and the materials loaded on the transfer vehicles. In an embodiment, Korean Patent Publication No. 10-1374665 discloses a transport vehicle equipped with a buffer stopper to reduce an impact when a collision occurs between the transport vehicles.

However, even if the above buffer stopper is used, it is not possible to completely eliminate the impact caused by physical contact, so a new method is required to prevent collisions between the above transport vehicles.

SUMMARY

Embodiments of the inventive concept provide a transfer apparatus for absorbing an impact during a collision.

The technical objectives of the inventive concept are not limited to the above-mentioned ones, and the other unmentioned technical objects will become apparent to those skilled in the art from the following description.

The inventive concept provides a transfer apparatus. The transfer apparatus includes a transfer truck; and a bumper device installed at any one of the front part or the rear part of the transfer truck, and wherein the bumper device includes: a bumper provided spaced apart from the transfer truck; and an impact attenuation unit provided between the bumper and the transfer truck and configured to attenuate an impact force transferred from the bumper to the transfer truck by a friction force.

In an embodiment, the impact attenuation unit includes: a first support fixed to a frame of the transfer truck and having a slot in a longitudinal direction; a second support fixed to the bumper; and a friction pin fixed to the second support to be inserted to the slot formed on the first support and attenuating an impact by a friction force generated while moving along the slot if the bumper is impacted.

In an embodiment, the slot is formed to increase the friction force with the friction pin as it moves further from the bumper.

In an embodiment, a width of the slot decreases as it moves further from the bumper.

In an embodiment, a direction of the slot is formed to be curved in an upward direction or a downward direction.

In an embodiment, the slot includes a first section having a diameter larger than a diameter of the friction pin, a second section having a diameter smaller than the first section, and a third section having a diameter larger than the second section and smaller than the first section.

In an embodiment, the second section and the third direction are continuously formed.

In an embodiment, the bumper includes a front part positioned at a predetermined distance from the transfer truck and a side part extending from both sides of the front part and fixed to the frame of the transfer truck, and wherein the second support is fixed to a bottom surface of the front part.

The inventive concept provides a transfer apparatus. The transfer apparatus includes a driving module configured to be movable along a driving rail; a gripper unit configured to pick up a transfer object; a car main body mounted on the gripper unit and connected to the driving module; and a bumper device installed at any one of a front part and a rear part of the car main body, and wherein the bumper device includes: a bumper having both sides fixed to the car main body; and an impact attenuation unit provided between the bumper and the car main body to minimize an impact to the bumper from being transferred to the car main body.

In an embodiment, the impact attenuation unit includes: a first support fixed to the car main body and having a slot in a longitudinal direction; a second support fixed to the bumper; and a friction pin fixed to the second support to be inserted to the slot formed on the first support and attenuating an impact by a friction force generated while moving along the slot if the bumper is impacted.

In an embodiment, the slot is formed to increase the friction force with the friction pin as it moves further from the bumper.

In an embodiment, a width of the slot decreases as it moves further from the bumper.

In an embodiment, a direction of the slot is formed to be curved in an upward direction or a downward direction.

In an embodiment, the slot includes a first section having a diameter larger than a diameter of the friction pin, a second section having a diameter smaller than the first section, and a third section having a diameter larger than the second section and smaller than the first section.

In an embodiment, the second section and the third direction are continuously formed.

In an embodiment, the bumper includes a front part positioned at a predetermined distance from the transfer truck and a side part extending from both sides of the front part and fixed to the frame of the transfer truck, and wherein the second support is fixed to a bottom surface of the front part.

In an embodiment, two first supports are provided spaced apart, and the second support is positioned between the first support.

In an embodiment, two second supports are provided spaced apart, and the first support is positioned between the second support.

The inventive concept provides a transfer apparatus. The transfer apparatus includes a driving module configured to be movable along a driving rail; a gripper unit configured to pick up a transfer object; a car main body mounted on the gripper unit and connected to the driving module; and a bumper device installed at any one of a front part and a rear part of the car main body, and wherein the bumper device includes: a bumper having both sides fixed to the car main body; and a first support fixed to the car main body and having a slot in a longitudinal direction; a second support fixed to the bumper; and a friction pin fixed to the second support to be inserted to the slot formed on the first support and attenuating an impact by a friction force generated while moving along the slot if the bumper is impacted.

In an embodiment, the slot is formed to increase the friction force with the friction pin as it moves further from the bumper, and the bumper includes a front part positioned at a predetermined distance from the car main body and a side part extending from both sides of the front part and fixed to the frame of the car main body, and wherein the second support is fixed to a bottom surface of the front part.

According to an embodiment of the inventive concept, an impact transferred to a main body may be minimized by reducing an impact force by a friction force generated during a process while the friction pin moves according to a slot despite an impact on a bumper.

The effects of the inventive concept are not limited to the above-mentioned ones, and the other unmentioned effects will become apparent to those skilled in the art from the following description.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Figure 1:
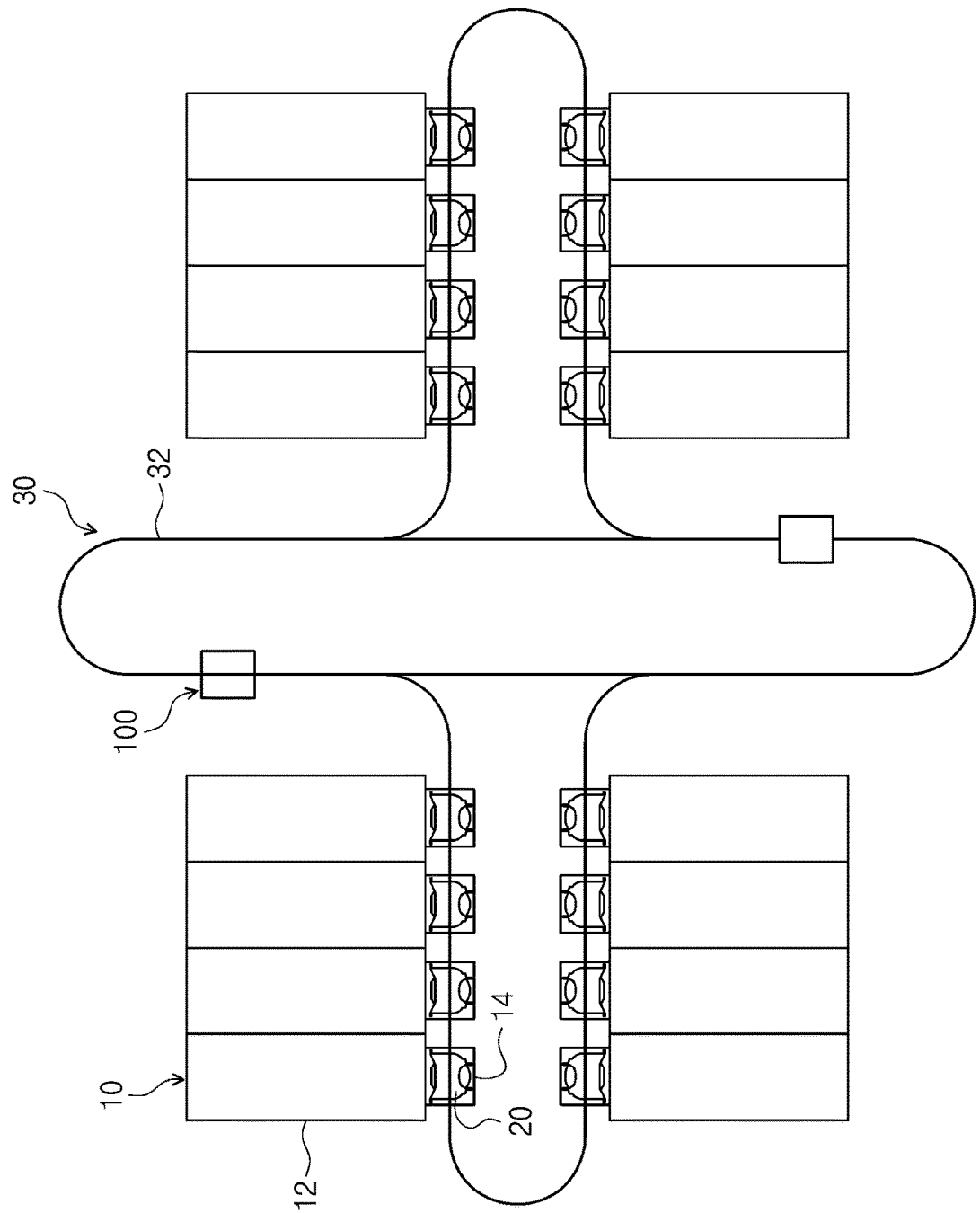
FIG. 1 is a plan view of a transfer facility having a transfer apparatus.

The inventive concept may be variously modified and may have various forms, and specific embodiments thereof will be illustrated in the drawings and described in detail. However, the embodiments according to the concept of the inventive concept are not intended to limit the specific disclosed forms, and it should be understood that the present inventive concept includes all transforms, equivalents, and replacements included in the spirit and technical scope of the inventive concept. In a description of the inventive concept, a detailed description of related known technologies may be omitted when it may make the essence of the inventive concept unclear.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Also, the term "exemplary" is intended to refer to an example or illustration.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the inventive concept.

Hereinafter, embodiments of the inventive concept will be described in detail with reference to the accompanying drawings.

Figure 2:
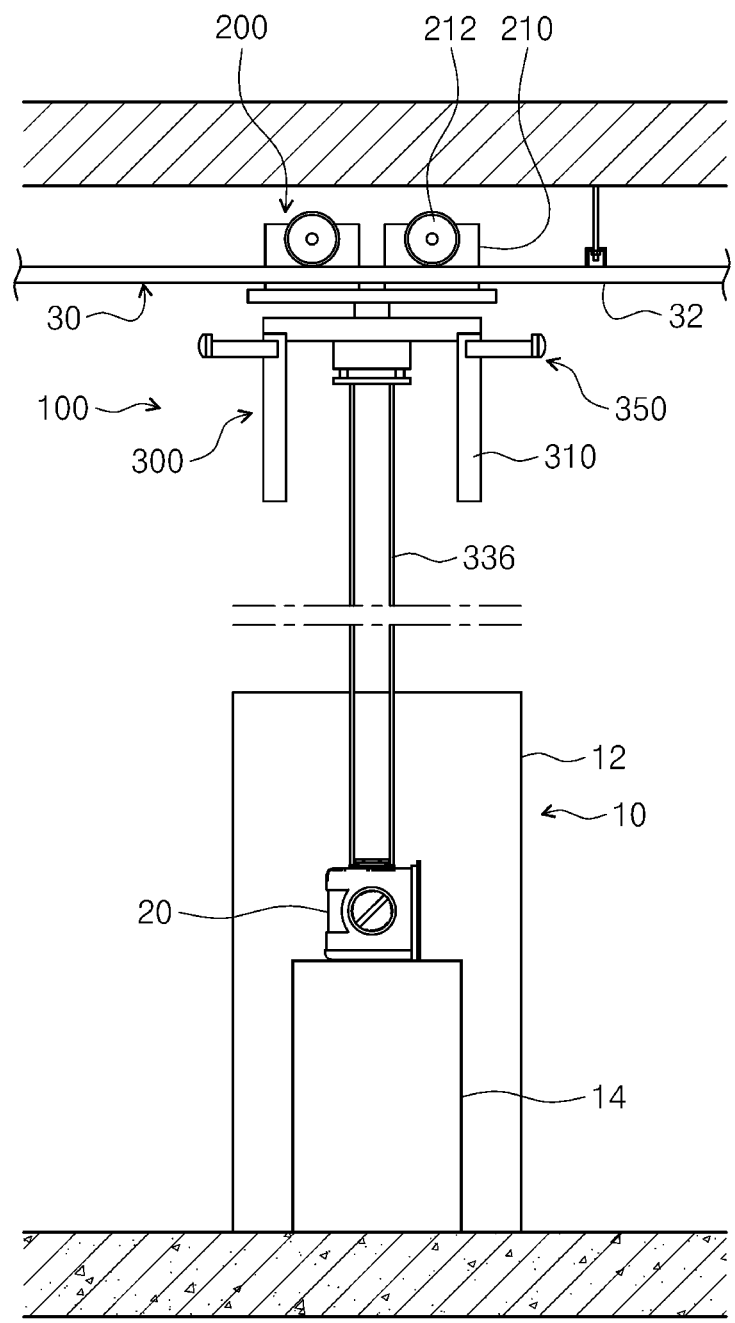
FIG. 2 is a side view illustrating the transfer apparatus which is in a state of transferring a transfer object to a mounting location.

FIG. 1 is a plan view of a transfer facility having a transfer apparatus, and FIG. 2 is a side view of the transfer apparatus transferring a transfer object to a mounting location.

As shown in FIG. 1 and FIG. 2, the transfer apparatus 100 may include a transfer truck which transfers the transfer object 20 to a transfer location 10.

In this embodiment, the transfer apparatus 100 transfers the transfer object 20 to each of the transfer locations 10 in a transfer facility having a plurality of transfer locations 10. The transfer object 20 is an object to be transferred, and may be, for example, a single item, or a combination of a plurality of items such as an object to be stored and a container storing the object. In this embodiment, transfer object 20 may be a substrate storage container such as a Front Opening Unified Pod (FOUP) in which a plurality of substrates are stored.

In this embodiment, the transfer location 10 includes a treating apparatus 12 for treating a semiconductor substrate and a mounting location 14 for mounting the substrate storage container, which is a transfer object 20. For example, the treating apparatus 12 withdraws the semiconductor substrate from the substrate storage container 20 mounted on the mounting location 14 and treats the semiconductor substrate. In addition, the treating apparatus 12 stores the treated semiconductor substrate in the substrate storage container mounted on the mounting location 14. As shown in FIG. 1, a plurality of transfer locations 10 are provided in the transfer facility. For example, in the transfer facility, a transfer path 30 is installed to pass through the plurality of transfer locations 10.

As shown in FIG. 2, in the inventive concept, the transfer path 30 is determined by a rail 32 connected to a ceiling. In addition, the mounting location 14 is installed below the rail 32 and is installed to overlap the rail 32 when viewed on a plane (see FIG. 1).

In the embodiment, the transfer apparatus 100 is an Overhead Hoist Transport (OHT) apparatus which drives on a rail 32 and transfers the transfer object 20 to each of the plurality of transfer locations 10. In this embodiment, a plurality of such transfer apparatuses 100 are provided in the transfer facility. In addition, as shown in FIG. 2, the transfer apparatus 100 transfers the transfer object 20 to the mounting location 14 installed below. In other words, the transfer apparatus 100 lowers the transfer object 20 from a height (a height of the rail 32) at which the transfer apparatus 100 is disposed, toward the mounting location 14, and mounts the transfer object 20 on the mounting location 14.

Figure 3:
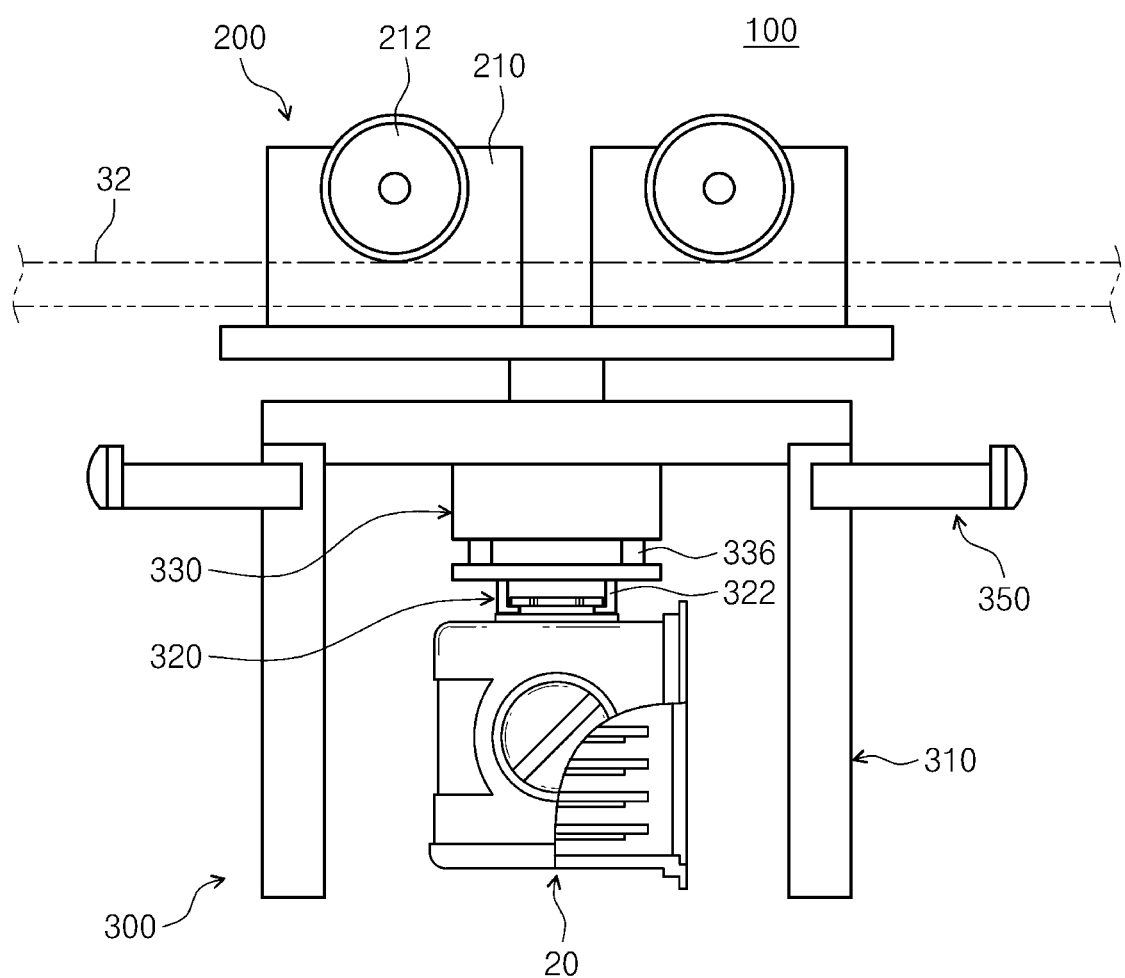
FIG. 3 and FIG. 4 illustrate the transfer apparatus.
Figure 4:
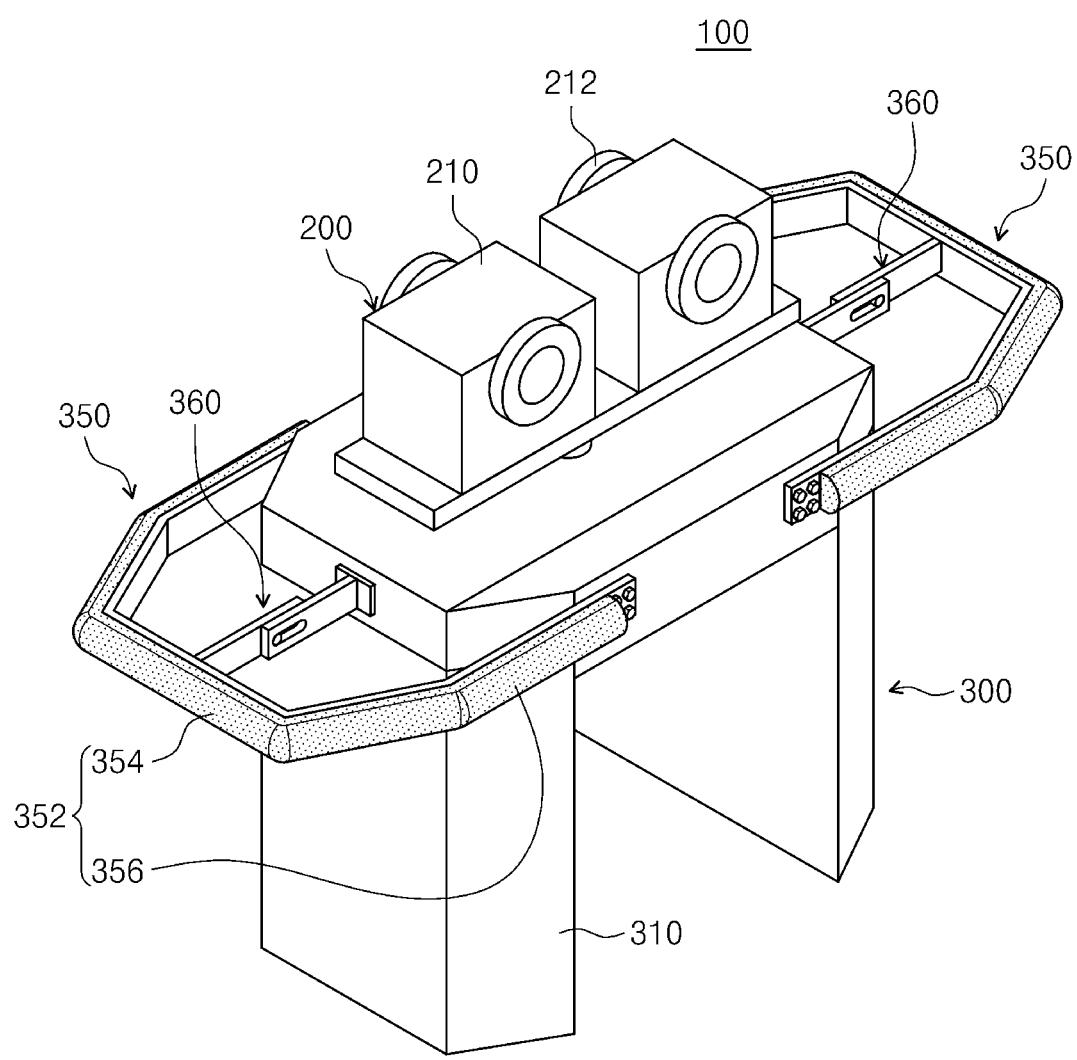

FIG. 3 and FIG. 4 illustrate the transfer apparatus.

As shown in FIG. 3 and FIG. 4, the transfer apparatus 100 transfers the transfer object (20; hereinafter referred to as a substrate storage container) in a suspended state. In the inventive concept, the transfer apparatus 100 may be a transfer truck including a driving module 200 and a hoist module 300.

The driving module 200 drives along the rail 32 provided along the ceiling of the semiconductor manufacturing line by a separate driving unit. The driving module 200 may include a body 210 having a driving wheel 212 on both sides thereof. Although not shown, an actuator for rotating the driving wheel 212 may be provided inside the body 210. The body 210 drives along the rail 32. Specifically, the body 210 may drive while rotating while the driving wheel 212 is in contact with the rail 32. Meanwhile, although not shown, a steering wheel may be provided on a top surface of the body 210. The steering wheel is provided to be movable along a horizontal direction perpendicular to a driving direction of the body. For example, the steering wheel may move in the left and right directions of the body 210. The steering wheel may selectively be in contact with a straight steering rail (not shown) guiding a straight driving and a branch steering rail (not shown) guiding a branch driving.

The hoist module 300 may include a main body 310 mounted on the driving module 200, a gripper unit 320 for picking up the substrate storage container 20, a lifting/lowering unit 330 for lifting/lowering the gripper unit 320, and a bumper device 350 provided at a front and rear of the main body, respectively.

The main body 310 is fixed as if hanging from a bottom portion of the driving module. A front surface of the main body 310, which is a side surface, may be opened for a vertical movement and a horizontal movement of the substrate storage container 20. In this case, the side surface may be a direction perpendicular to the driving direction of the transfer apparatus 100.

The gripper unit 320 may be connected to the lifting/lowering unit 330 through a plurality of lifting/lowering belts 336, and may include grippers 322 for gripping the substrate storage container 20. In addition, a flange configured to be gripped by the grippers 322 may be provided on the substrate storage container 20.

The gripper unit 320 may include a gripper driving unit (not shown) for driving the grippers 322, for example, the gripper driving unit may operate the grippers 322 using a cam plate and a cam follower, and may include a motor and a ball screw to move the cam plate. However, since the configuration of the gripper unit 320 itself may be variously changed, the scope of the inventive concept is not limited thereby.

The bumper device 350 may be provided at the front and rear sides of the main body, respectively. The bumper device 350 may include a bumper 352 and an impact attenuation unit 360.

Figure 5:
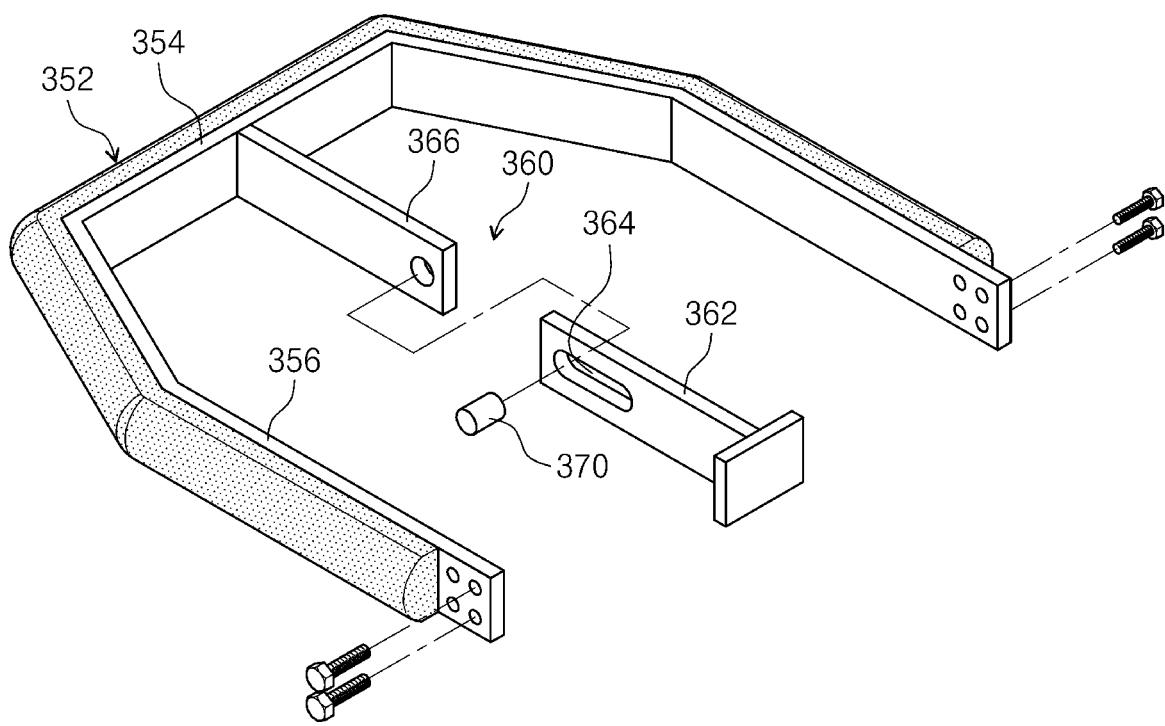
FIG. 5 and FIG. 6 illustrate an impact attenuation unit.
Figure 6:
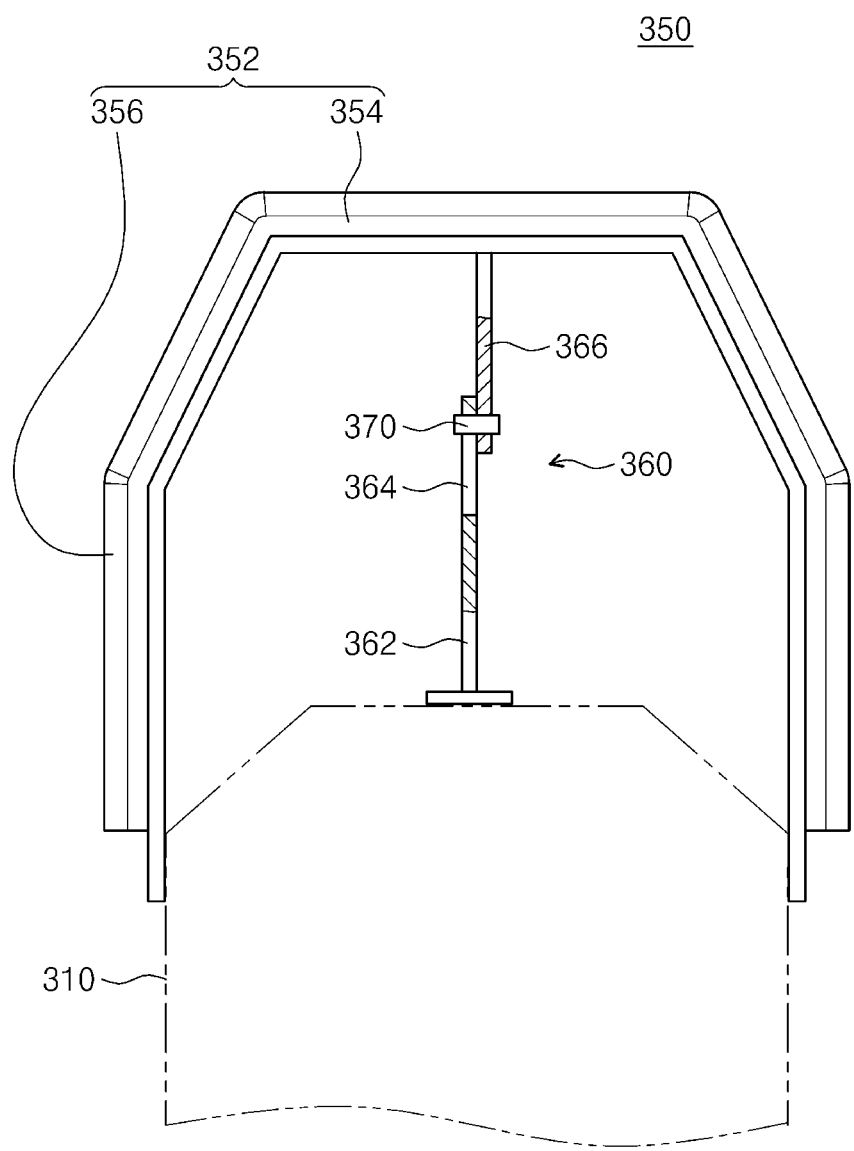

FIG. 5 and FIG. 6 illustrate the impact attenuation unit.

As shown in FIG. 5 and FIG. 6, the bumper 352 may be provided to be spaced apart from the main body 310. In an embodiment, the bumper 352 may include a front part 354 positioned at a predetermined distance from the main body 310 and a side part 356 extending from both sides of the front part 354 and fixed to a frame of the main body 310.

The impact attenuation unit 360 may be provided between the front part 354 of the bumper 352 and the main body 310. The impact attenuation unit 360 is a device for mitigating an impact force transmitted from the bumper 352 to the main body 310 by a friction force.

According to an embodiment, the impact attenuation unit 360 may include a first support 362, a second support 366, and a friction pin 370. The first support 362 is fixed to the frame of the main body 310. The first support 362 is formed of a rod-shaped frame and is horizontally installed toward the front part 354 of the bumper 352. The first support 362 has a slot 364 formed in a lengthwise direction.

The second support 366 is fixed to the bumper 352. The second support 366 is formed of a rod-shaped frame and is installed to face the main body 310. The first support 362 and the second support 366 have a length which may partially overlap.

The friction pin 370 is fixed to the second support 366 to be inserted into the slot 364 formed in the first support 362. The friction pin 370 may alleviate an impact by a friction force generated while moving along the slot 364 if an impact is generated at the bumper 352.

The slot 364 is formed such that a friction force with the friction pin 370 increases as a distance from the bumper 352 increases. In an embodiment, an end of the slot 364 closer to the bumper 352 may be larger than a diameter d3 of the friction pin 370, and the other end of the slot 364 further from the bumper 352 may be formed to have a diameter d2 smaller than the friction pin 370. For reference, a size of the slot and the number of friction pins can be selectively combined and applied to absorb an appropriate impact force according to an operating speed of the transfer apparatus.

Figure 7:
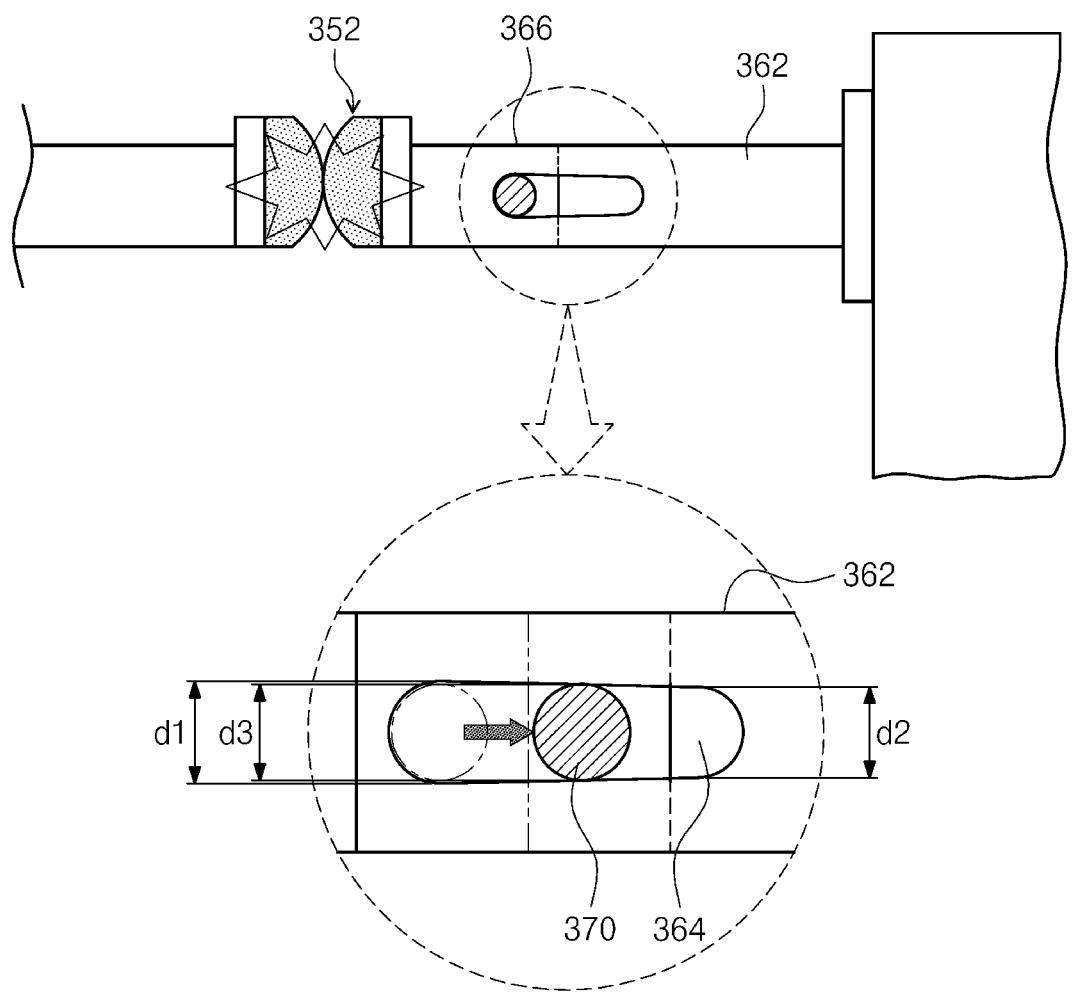
FIG. 7 illustrates a performance effect at the impact attenuation unit.

FIG. 7 illustrates a performance effect at the impact attenuation unit.

As shown in FIG. 7, if an impact is applied to the bumper device 350, the impact is primarily absorbed by a plastic deformation of the bumper 352. In addition, the friction pin 370 moves from an end of the slot 364 to the other end due to the plastic deformation of the bumper 352, and the impact is absorbed by the friction between the friction pin 370 and the slot 364, and the microplastic deformation of the contact surface.

Figure 8A:
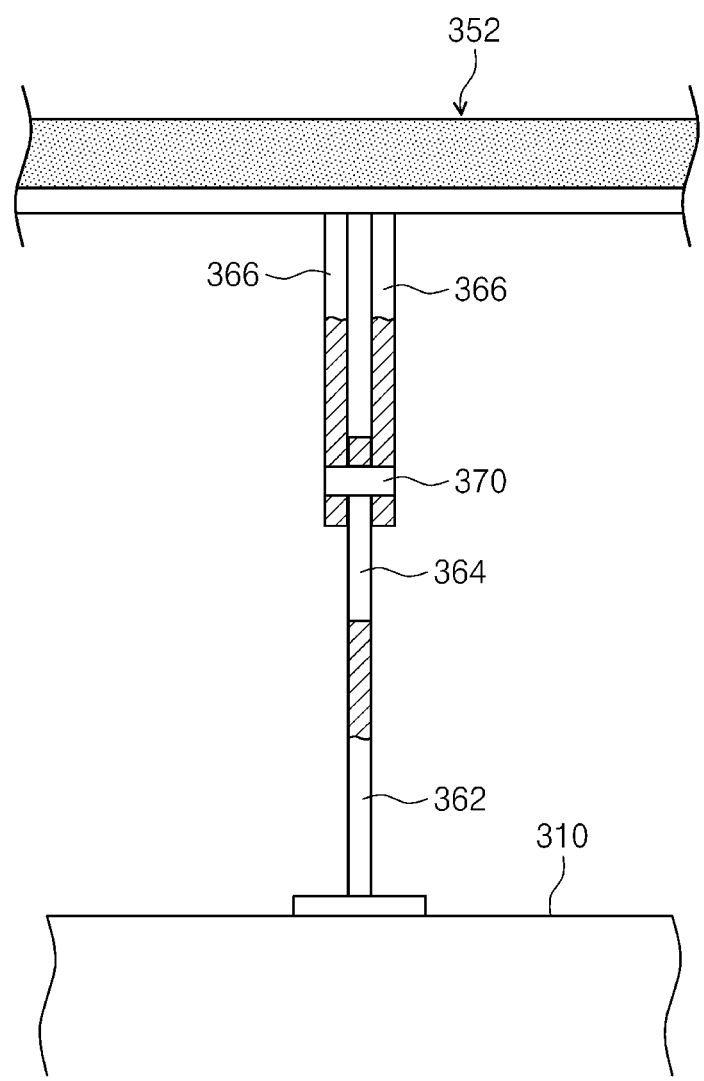
FIG. 8A and FIG. 8B illustrate a modified embodiment of the impact attenuation unit.
Figure 8B:
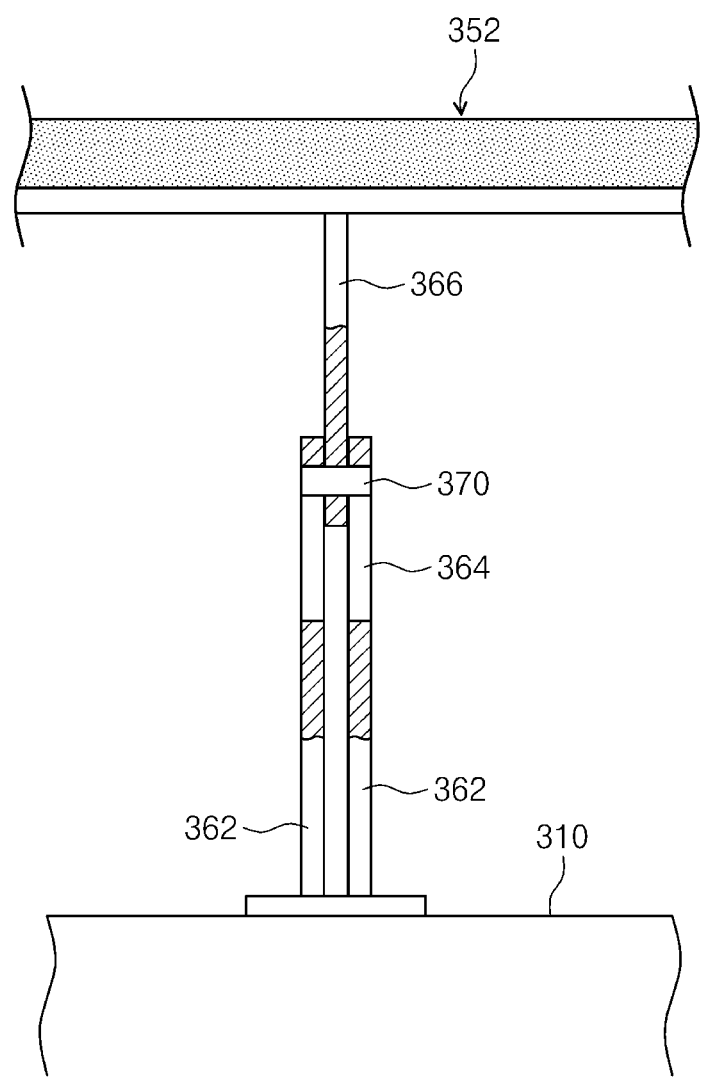

FIG. 8A and FIG. 8B illustrate a modified embodiment of the impact attenuation unit.

As shown in FIG. 8A and FIG. 8B, the impact attenuation unit 360 may apply one first support 362 and two second supports 366 or two first supports 362 and one second support 366 as needed.

Figure 9A:
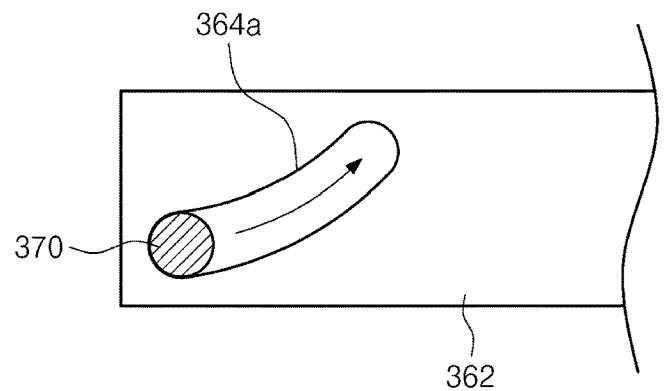
FIG. 9A to FIG. 9C illustrate various modified embodiments of a slot.
Figure 9B:
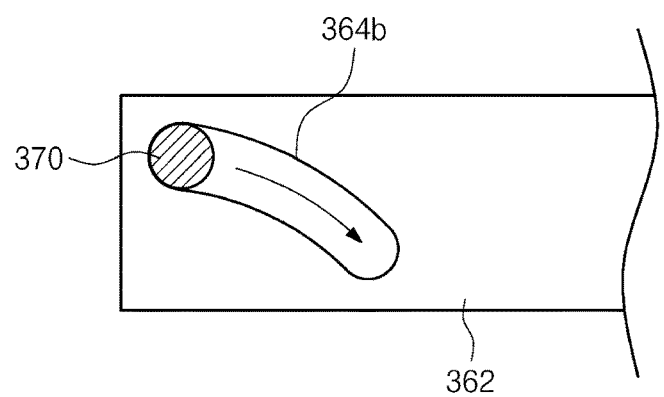
Figure 9C:
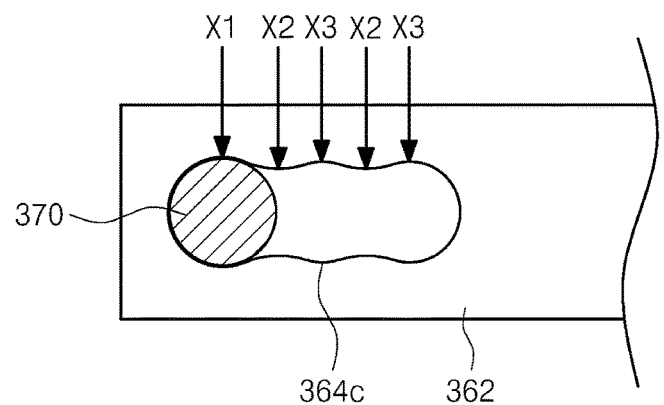

FIG. 9A to FIG. 9C illustrate various modifications of the slot.

As illustrated in FIG. 9A, the slot 364a may be upwardly curved. In another embodiment, the slot 364b may be formed to be downwardly curved. If the slots 364a and 364b having this shape are applied, if an impact is applied to the bumper device 350, the friction pin 370 moves upwardly or downwardly along the slots 364a and 364b, causing the bumper 352 to move down or move up. That is, an impact force applied to the bumper 352 in a horizontal direction may improve an attenuation effect as a direction is tilted by a shape of the slots 364a and 364b.

The slot 364c illustrated in FIG. 9C may include a first section X1 having a diameter larger than the diameter of the friction pin 370, a second section X2 having a diameter smaller than the first section X1, and a third section X3 having a diameter larger than the second section X2 and smaller than the first section X1. The second section X2 and the third section X3 may be continuously formed. For reference, the diameter of the second section is smaller than the diameter of the friction pin 370.

A friction force may occur while the friction pin passes the second section at a slot having the same configuration as above.

The effects of the inventive concept are not limited to the above-mentioned effects, and the unmentioned effects can be clearly understood by those skilled in the art to which the inventive concept pertains from the specification and the accompanying drawings.

Although the preferred embodiment of the inventive concept has been illustrated and described until now, the inventive concept is not limited to the above-described specific embodiment, and it is noted that an ordinary person in the art, to which the inventive concept pertains, may be variously carry out the inventive concept without departing from the essence of the inventive concept claimed in the claims and the modifications should not be construed separately from the technical spirit or prospect of the inventive concept.

What is claimed is:

1. A transfer apparatus comprising:
   a transfer truck; and
   a bumper device installed at any one of a front part and a rear part of the transfer truck,
   wherein the bumper device comprises:
   a bumper provided spaced apart from the transfer truck; and
   an impact attenuation unit provided between the bumper and the transfer truck and configured to attenuate an impact force transferred from the bumper to the transfer truck by a friction force,
   wherein the impact attenuation unit comprises:
   a first support fixed to a frame of the transfer truck and having a slot in a longitudinal direction;
   a second support fixed to the bumper; and
   a friction pin fixed to the second support to be inserted to the slot formed on the first support and attenuating an impact by a friction force generated while moving along the slot if the bumper is impacted, and
   wherein the slot is formed to increase the friction force with the friction pin as it moves further from the bumper.

2. The transfer apparatus of claim 1,
   wherein a width of the slot decreases as it moves further from the bumper.

3. The transfer apparatus of claim 2,
   wherein a direction of the slot is formed to be curved in an upward direction or a downward direction.

4. The transfer apparatus of claim 2,
   wherein the slot includes a first section having a diameter larger than a diameter of the friction pin, a second section having a diameter smaller than the first section, and a third section having a diameter larger than the second section and smaller than the first section.

5. The transfer apparatus of claim 4,
   wherein the second section and the third section are continuously formed.

6. The transfer apparatus of claim 1, wherein the bumper includes a front part positioned at a predetermined distance from the transfer truck and a side part extending from both sides of the front part and fixed to the frame of the transfer truck, and
   wherein the second support is fixed to a bottom surface of the front part.

7. A transfer apparatus comprising:
   a driving module configured to be movable along a driving rail;
   a gripper unit configured to pick up a transfer object;
   a car main body mounted on the gripper unit and connected to the driving module; and
   a bumper device installed at any one of a front part and a rear part of the car main body,
   wherein the bumper device comprises:
   a bumper having both sides fixed to the car main body; and
   an impact attenuation unit provided between the bumper and the car main body to minimize an impact to the bumper from being transferred to the car main body.

8. The transfer apparatus of claim 7,
   wherein the impact attenuation unit comprises:
   a first support fixed to the car main body and having a slot in a longitudinal direction;
   a second support fixed to the bumper; and
   a friction pin fixed to the second support to be inserted to the slot formed on the first support and attenuating the impact by a friction force generated while moving along the slot if the bumper is impacted.

9. The transfer apparatus of claim 8,
   wherein the slot is formed to increase the friction force with the friction pin as it moves further from the bumper.

10. The transfer apparatus of claim 9,
    wherein a width of the slot decreases as it moves further from the bumper.

11. The transfer apparatus of claim 10,
    wherein a direction of the slot is formed to be curved in an upward direction or a downward direction.

12. The transfer apparatus of claim 10,
    wherein the slot includes a first section having a diameter larger than a diameter of the friction pin, a second section having a diameter smaller than the first section, and a third section having a diameter larger than the second section and smaller than the first section.

13. The transfer apparatus of claim 12,
    wherein the second section and the third section are continuously formed.

14. The transfer apparatus of claim 8,
    wherein the bumper includes a front part positioned at a predetermined distance from the car main body and a side part extending from both sides of the front part and fixed to a frame of the car main body, and
    wherein the second support is fixed to a bottom surface of the front part.

15. The transfer apparatus of claim 8,
    wherein two first supports are provided spaced apart, and the second support is positioned between the first support.

16. The transfer apparatus of claim 8,
    wherein two second supports are provided spaced apart, and the first support is positioned between the second support.

17. A transfer apparatus comprising:
a driving module configured to be movable along a driving rail;
a gripper unit configured to pick up a transfer object;
a car main body mounted on the gripper unit and connected to the driving module; and
a bumper device installed at any one of a front part and a rear part of the car main body,
wherein the bumper device comprises:
a bumper having both sides fixed to the car main body; and
a first support fixed to the car main body and having a slot in a longitudinal direction;
a second support fixed to the bumper; and
a friction pin fixed to the second support to be inserted to the slot formed on the first support and attenuating an impact by a friction force generated while moving along the slot if the bumper is impacted.

18. The transfer apparatus of claim 17,
wherein the slot is formed to increase the friction force with the friction pin as it moves further from the bumper, and the bumper includes a front part positioned at a predetermined distance from the car main body and a side part extending from both sides of the front part and fixed to a frame of the car main body, and
wherein the second support is fixed to a bottom surface of the front part.

* * * * *